United States Patent
Otsuka et al.

(10) Patent No.: US 11,577,957 B2
(45) Date of Patent: Feb. 14, 2023

(54) HEXAGONAL BORON NITRIDE POWDER, METHOD FOR PRODUCING SAME, RESIN COMPOSITION AND RESIN SHEET

(71) Applicant: SHOWA DENKO K.K., Tokyo (JP)

(72) Inventors: Yuki Otsuka, Kawasaki (JP); Masaru Fukasawa, Shiojiri (JP)

(73) Assignee: SHOWA DENKO K.K., Tokyo (JP)

( * ) Notice: Subject to any disclaimer, the term of this patent is extended or adjusted under 35 U.S.C. 154(b) by 503 days.

(21) Appl. No.: 16/473,455

(22) PCT Filed: Dec. 26, 2017

(86) PCT No.: PCT/JP2017/046769
§ 371 (c)(1),
(2) Date: Jun. 25, 2019

(87) PCT Pub. No.: WO2018/124126
PCT Pub. Date: Jul. 5, 2018

(65) Prior Publication Data
US 2020/0148537 A1    May 14, 2020

(30) Foreign Application Priority Data
Dec. 28, 2016 (JP) .............................. JP2016-255975

(51) Int. Cl.
*C01B 21/064* (2006.01)
*C08L 101/00* (2006.01)
*C08K 3/38* (2006.01)

(52) U.S. Cl.
CPC ...... *C01B 21/0646* (2013.01); *C01B 21/0645* (2013.01); *C08L 101/00* (2013.01);
(Continued)

(58) Field of Classification Search
None
See application file for complete search history.

(56) References Cited

U.S. PATENT DOCUMENTS

| | | |
|---|---|---|
| 2002/0076557 A1 | 6/2002 | Fauzi et al. |
| 2014/0349105 A1 | 11/2014 | Yamazaki et al. |

(Continued)

FOREIGN PATENT DOCUMENTS

| | | |
|---|---|---|
| CN | 1227531 A | 9/1999 |
| CN | 105947997 A | 9/2016 |

(Continued)

OTHER PUBLICATIONS

JP2015212217A translation provided by Google Jan. 13, 2021.*
(Continued)

*Primary Examiner* — Guinever S Gregorio
(74) *Attorney, Agent, or Firm* — Sughrue Mion, PLLC

(57) ABSTRACT

A hexagonal boron nitride powder having an average longer diameter (L) of primary particles in the hexagonal boron nitride powder of more than 10.0 μm and 30.0 μm or less, an average thickness (D) of the primary particles in the hexagonal boron nitride powder of 1.0 μm or more, a ratio of the average longer diameter (L) to the average thickness (D), [L/D], of 3.0 or more and 5.0 or less, and a content of primary particles having a ratio of a longer diameter (1) to a thickness (d), [l/d], of 3.0 or more and 5.0 or less of 25% or more, a method for producing the hexagonal boron nitride powder, and a resin composition and a resin sheet each containing the hexagonal boron nitride powder.

8 Claims, 2 Drawing Sheets

(52) U.S. Cl.
CPC ...... *C01P 2004/22* (2013.01); *C01P 2004/61* (2013.01); *C01P 2006/12* (2013.01); *C08K 3/38* (2013.01)

(56) References Cited

U.S. PATENT DOCUMENTS

| | | | |
|---|---|---|---|
| 2016/0115343 A1 | 4/2016 | Takahara et al. | |
| 2017/0335160 A1 | 11/2017 | Yamazaki et al. | |

FOREIGN PATENT DOCUMENTS

| | | | |
|---|---|---|---|
| EP | 2 623 458 A1 | 8/2013 | |
| JP | 61-286207 A | 12/1986 | |
| JP | 05-85482 B2 | 12/1993 | |
| JP | 07-041311 A | 2/1995 | |
| JP | 3461651 B2 | 10/2003 | |
| JP | 2005-343728 A | 12/2005 | |
| JP | 2007-308360 A | 11/2007 | |
| JP | 2011-098882 A | 5/2011 | |
| JP | 4750220 B2 | 8/2011 | |
| JP | 2012-176910 A | 9/2012 | |
| JP | 5081488 B2 | 11/2012 | |
| JP | 2015-212217 A | 11/2015 | |
| JP | 2015212217 A | * 11/2015 | |
| JP | 2016-216271 A | 12/2016 | |
| JP | 2017-222522 A | 12/2017 | |
| WO | 2014/109134 A1 | 7/2014 | |
| WO | 2016/092951 A1 | 6/2016 | |
| WO | 2017/126608 A1 | 7/2017 | |
| WO | 2017/145869 A1 | 8/2017 | |

OTHER PUBLICATIONS

International Search Report of PCT/JP2017/046769 dated Mar. 13, 2018.
Communication dated Jul. 17, 2020, from the European Patent Office in European Application No. 17887923.5.
Communication dated Aug. 13, 2019, from the Japanese Patent Office in application No. 2018-559539.
Certificate of Experimental result dated Mar. 14, 2018, submitted by a third party in Japanese application No. 2017-537747.
Communication dated Jan. 28, 2022 from the Chinese Patent Office in Chinese Application No. 201780079468.6.

* cited by examiner

HEXAGONAL BORON NITRIDE POWDER, METHOD FOR PRODUCING SAME, RESIN COMPOSITION AND RESIN SHEET

CROSS REFERENCE TO RELATED APPLICATIONS

This application is a National Stage of International Application No. PCT/JP2017/046769, filed Dec. 26, 2017, claiming priority to Japanese Patent Application No. 2016-255975, filed Dec. 28, 2016.

TECHNICAL FIELD

The present invention relates to a hexagonal boron nitride (hereinafter, also simply referred to as "hBN") powder and a resin sheet comprising the hBN powder and particularly relates to a high-purity hBN powder comprising hBN primary particles having a large average longer diameter and a small aspect ratio, a method for producing the hBN powder, and a resin composition and a resin sheet each comprising the hBN powder.

BACKGROUND ART

An hBN particle has a layered structure similar to that of graphite, has excellent properties such as thermal conductive properties, electric insulation, chemical stability, lubricating properties as a solid, and thermal shock resistance, and therefore is used as an insulation/heat dissipation material, a solid lubricant, solid mold release agent, a raw material for producing an hBN sintered body, and the like taking advantage of these properties.

Conventionally, the hBN powder has generally been obtained by mixing a boron compound such as boric acid or borax and a nitrogen compound such as melamine or urea, then firing the resultant mixture at a relatively low temperature under an ammonia atmosphere or a non-oxidizing gas atmosphere to produce a crude hBN powder having a low crystallinity, and subsequently firing the obtained crude hBN powder at a high temperature under a non-oxidizing gas atmosphere to allow the crystals to grow (PTLs 1 to 3).

A sheet, tape, grease, or the like in which such an hBN powder is contained as a filler in a resin material such as an epoxy resin, silicone rubber, or the like is used as a thermally conductive member, such as, for example, a thermally conductive sheet or thermally conductive grease having electric insulation, for effectively dissipating heat generated from an electronic component. To further improve the thermal conductive properties of these thermally conductive members, attempts to increase the filling ability of the hBN powder in the thermally conductive members are being made.

However, the primary particle of hBN generally has a scale-like particle shape, and the ratio of the average longer diameter to the average thickness (hereinafter, also simply referred to as "aspect ratio") of the primary particles is high, and therefore when the filling ability is enhanced, the primary particles easily face in a constant direction and the orientation anisotropy easily occurs in a molded article, such as a thermally conductive sheet, obtained by molding a resin composition comprising the hBN powder. When such orientation anisotropy occurs, the properties such as the thermal conductive properties, the electric insulation, and the thermal heat resistance are lowered.

Therefore, in recent years, a method for mixing the hBN powder comprising secondary particles (hereinafter, also simply referred to as "aggregate") in which primary particles of hBN aggregate with a resin has been used for the purpose of improving the filling ability of the hBN powder and suppressing orientation anisotropy in a thermally conductive sheet (PTLs 4, 5).

However, in the case where the aspect ratio of the primary particles that constitute the aggregate is high, when the strength of the aggregate is not sufficient, the aggregate may disintegrate in a process of forming a composite with the resin, so that the orientation anisotropy occurs in the thermally conductive sheet, which is attributable to the high aspect ratio of the primary particles. In addition, when the disintegration of the aggregate is avoided, there is a problem that the filling ability of the hBN powder in the thermally conductive sheet cannot be enhanced sufficiently and the thermal conductivity is lowered.

Thus, attempts to obtain the hBN powder comprising primary particles having a low aspect ratio by subjecting boron carbide to nitriding treatment under a condition of 1800° C. or more in a nitrogen atmosphere, then mixing a resultant product with diboron trioxide or a precursor thereof, thereafter firing the resultant mixture, and removing a carbon component after that have been made for the purpose of improving the filling ability of the hBN powder in a thermally conductive sheet and improving the thermal conductive properties (PTLs 6, 7).

In addition, as another attempt to allow primary particles having a low aspect ratio to be contained in the hBN powder, a mixture obtained by adding an oxygen-containing calcium compound as a crystallization catalyst to a boron compound and a carbon source is heated under a nitrogen atmosphere (PTL 8).

PTL1: JP 61-286207 A
PTL2: JP 3461651 B
PTL3: JP 5-85482 B
PTL4: JP 2011-098882 A
PTL5: JP 2005-343728 A
PTL6: JP 4750220 B
PTL7: JP 5081488 B
PTL8: JP 2015-212217 A

SUMMARY OF INVENTION

Technical Problem

However, a sufficiently low aspect ratio has not been achieved yet by the techniques of PTLs 6 and 7.

In addition, a sufficiently low aspect ratio has not been achieved yet by the technique of PTL8 when an average is taken for all the primary particles contained in the hBN powder, and further reduction in the aspect ratio has been desired from the viewpoint of improving the thermal conductive properties.

Further, in the case where the average longer diameter of the primary particles is too small, the contact resistances between the primary particles and between the primary particle and a resin become large to bring about lowering of thermal conductivity when a composite is formed by the hBN powder and the resin and the composite is made into a resin composition. Therefore, an increase in the average longer diameter of the primary particles has also been desired.

The present invention intends to provide a high-purity hBN powder comprising hBN primary particles having a large average longer diameter and a low aspect ratio, the hBN powder having a more suppressed orientation anisotropy in a resin composition or a resin sheet than conventional hBN powders and having superior thermal conductive properties, a method for producing the hBN powder, and a resin composition and a resin sheet each comprising the hBN powder.

Solution to Problem

The present inventors have conducted diligent studies to find that an hBN powder having a larger average longer diameter (L) than conventional hBN powders and having a lower ratio of the average longer diameter (L) to the average thickness (D) of the primary particles, [L/D], than conventional hBN powders is obtained when a fired product obtained by firing a boron carbide powder under a nitrogen gas atmosphere is heated at a particular temperature under an oxygen-containing gas atmosphere, thereby decarbonizing the fired product, and thereafter the decarbonized product is fired again under a nitrogen gas atmosphere.

The present invention is based on the above-described findings.

That is, the present invention provides the following [1] to [9].

[1] A hexagonal boron nitride powder having: an average longer diameter (L) of primary particles in the hexagonal boron nitride powder of more than 10.0 µm and 30.0 µm or less; an average thickness (D) of the primary particles in the hexagonal boron nitride powder of 1.0 µm or more; a ratio of the average longer diameter (L) to the average thickness (D), [L/D], of 3.0 or more and 5.0 or less; and a content of primary particles having a ratio of a longer diameter (l) to a thickness (d), [l/d], of 3.0 or more and 5.0 or less of 25% or more.

[2] The hexagonal boron nitride powder according to [1], wherein the content is 50% or more.

[3] The hexagonal boron nitride powder according to [1] or [2], wherein the hexagonal boron nitride powder comprises an aggregate of two or more primary particles, and when the hexagonal boron nitride powder is put through a sieve having an opening of 106 µm, the hexagonal boron nitride powder passing through the sieve has a 50% volume cumulative particle size $D_{50}(1)$ of 25 µm or more and 100 µm or less, and a dispersion liquid obtained by dispersing in water the hexagonal boron nitride powder passing through the sieve has a 50% volume cumulative particle size $D_{50}(2)$ of 50 µm or less after the dispersion liquid is subjected to an ultrasonic treatment for 3 minutes.

[4] The hexagonal boron nitride powder according to any one of [1] to [3], having a BET specific surface area of 2.0 $m^2/g$ or less.

[5] A resin composition comprising: the hexagonal boron nitride powder according to any one of [1] to [4]; and an organic matrix, wherein the composition has a content of the hexagonal boron nitride powder of 10% by volume or more and 90% by volume or less based on a total amount of the hexagonal boron nitride powder and the organic matrix.

[6] A resin sheet comprising the resin composition according to [5] or a cured product thereof.

[7] A method for producing the hexagonal boron nitride powder according to any one of [1] to [4], the method comprising the following steps 1 to 3:

Step 1: a step of firing a boron carbide powder at 1600° C. or more and 2200° C. or less under a nitrogen gas atmosphere;

Step 2: a step of heating a fired product obtained in the step 1 at 500° C. or more and less than 1500° C. under an oxygen-containing gas atmosphere, thereby decarbonizing the fired product; and Step 3: a step of firing again a product after decarbonization, the product obtained in the step 2, at 1500° C. or more and 2200° C. or less in a nitrogen gas atmosphere.

[8] The method for producing the hexagonal boron nitride powder according to [7], wherein 10 parts by mass or more and 80 parts by mass or less of a boron compound represented by a composition formula $B_2O_{(3+X)}H_{2X}$ wherein X=0 to 3 based on 100 parts by mass of the product after decarbonization is added in the step 3.

[9] The method for producing the hexagonal boron nitride powder according to [7] or [8], wherein 10 parts by mass or more and 200 parts by mass or less of a calcium compound based on 100 parts by mass of the product after decarbonization is added in the step 3.

Advantageous Effects of Invention

According to the present invention, a high-purity hBN powder comprising hBN primary particles having a large average longer diameter and a low aspect ratio, the hBN powder having a more suppressed orientation anisotropy in a resin composition or a resin sheet than conventional hBN powders and having superior thermal conductive properties; a method for producing the hBN powder; and a resin composition and a resin sheet each comprising the hBN powder can be provided.

DESCRIPTION OF EMBODIMENTS

[Hexagonal Boron Nitride Powder]

Figure 1:
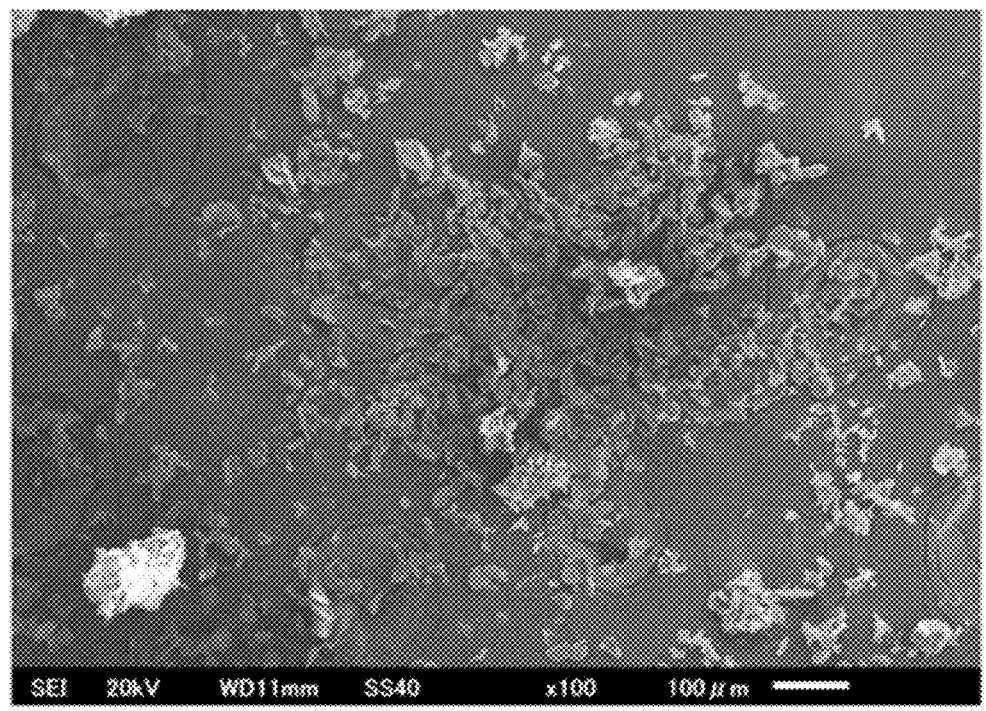
FIG. 1 is an SEM image of the hBN powder obtained in Example 1.
Figure 2:
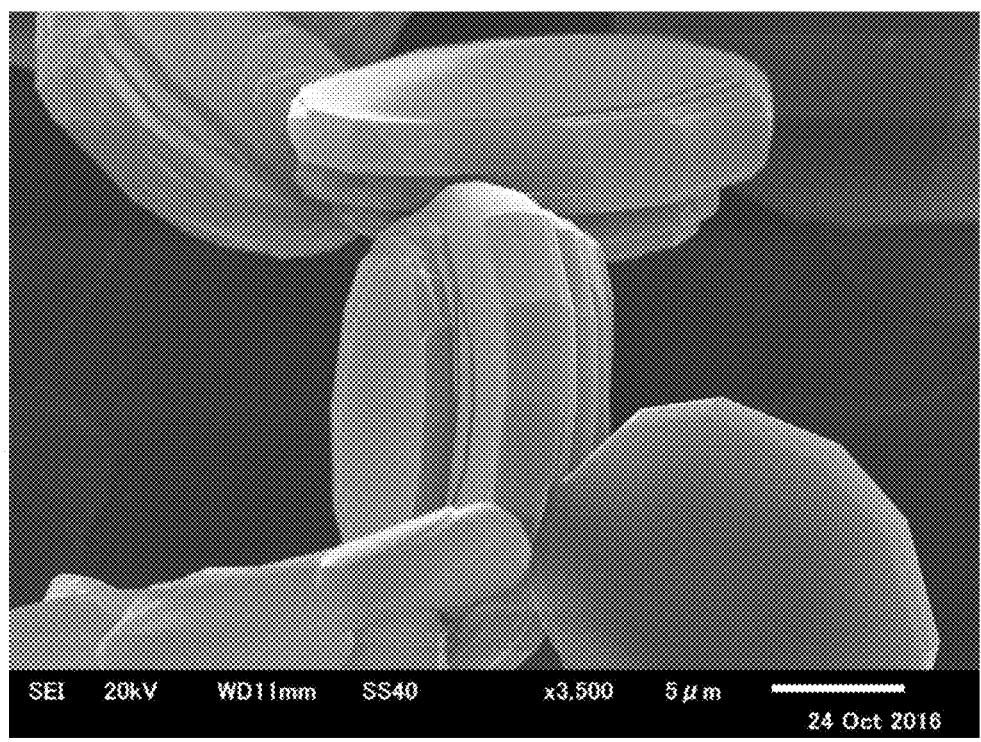
FIG. 2 is an enlarged SEM image of the hBN powder obtained in Example 1.
Figure 3:
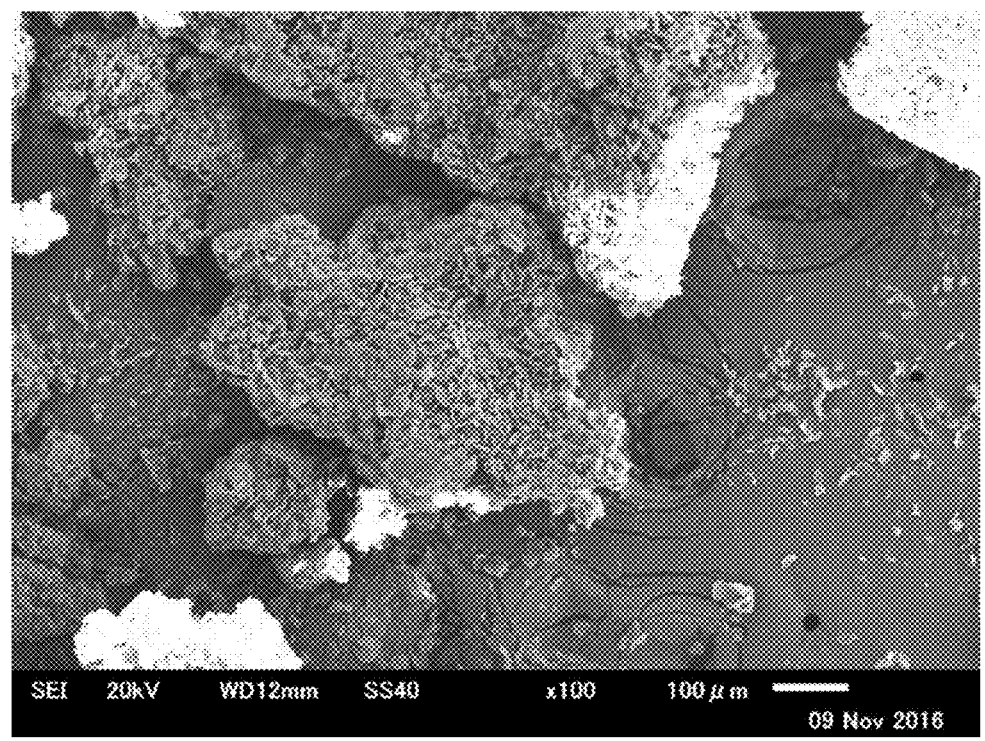
FIG. 3 is an SEM image of an hBN powder obtained in Comparative Example 1.
Figure 4:
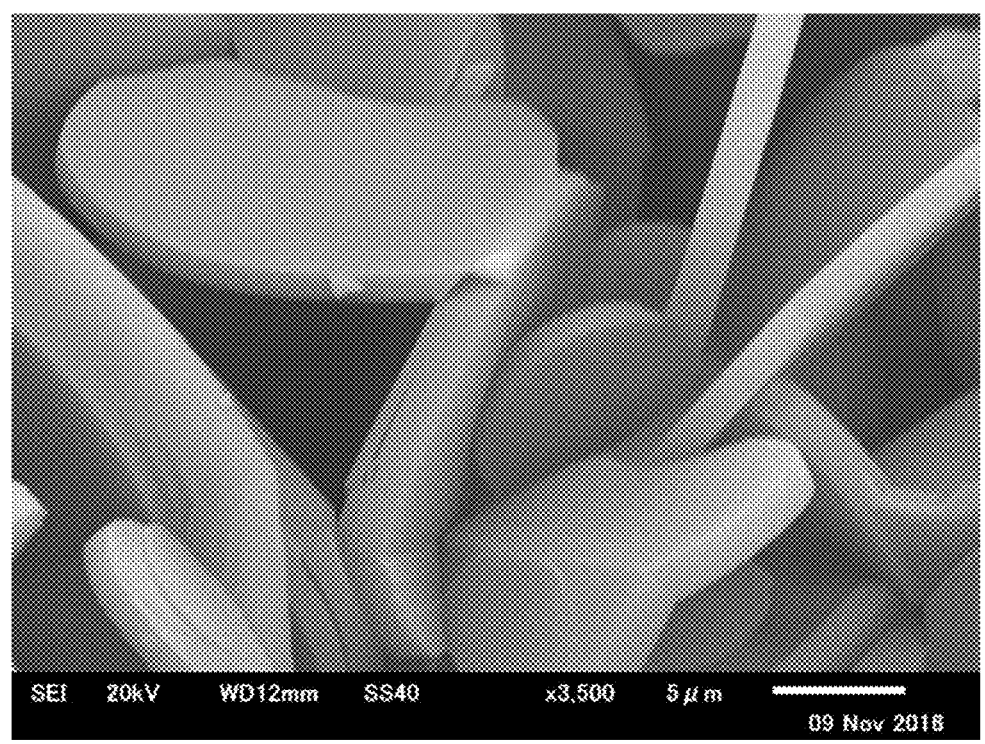
FIG. 4 is an enlarged SEM image of the hBN powder obtained in Comparative Example 1.

The hexagonal boron nitride powder (hBN powder) according to the present invention has an average longer diameter (L) of primary particles in the hBN powder of more than 10.0 µm and 30.0 µm or less, an average thickness (D) of the primary particles in the hBN powder of 1.0 µm or more, a ratio of the average longer diameter (L) to the average thickness (D), [L/D] (hereinafter, also simply referred to as "aspect ratio [L/D]"), of 3.0 or more and 5.0 or less, and a content of primary particles having a ratio of a longer diameter (l) to a thickness (d), [l/d] (hereinafter, also simply referred to as "aspect ratio [l/d]"), of 3.0 or more and 5.0 or less of 25% or more.

It is to be noted that in the present specification, the "average longer diameter" means a number average value of the longer diameters of the primary particles, and the "average thickness" means a number average value of the thicknesses of the primary particles. In addition, the "longer diameter" means the maximum diameter in a planer direction of a scale-like particle.

According to the present invention, a high-purity hBN powder comprising hBN primary particles having a large average longer diameter and a low aspect ratio, the hBN powder having a more suppressed orientation anisotropy in a resin composition or a resin sheet than conventional hBN powders and having superior thermal conductive properties, can be obtained. The reason that such an effect is obtained is not clear, but it is considered that the hBN powder according to the present invention has a large average longer diameter of primary particles of hBN, so that the contact resistances between the primary particles and between the primary particle and a resin are reduced and the thermal conductivity is improved when a composite is formed by the hBN powder and the resin, and the composite is made into a resin composition. In addition, it is considered that the hBN powder according to the present invention has a low aspect ratio [L/D] of the primary particles and a particular range of a content of primary particles having a particular aspect ratio [l/d], and therefore the hBN powder can improve the orientation anisotropy in a resin composition or a resin sheet and can exhibit high thermal conductive properties.

However, these are estimates, and the present invention is not limited to these mechanisms.

<Primary Particles>

The average longer diameter (L) of the primary particles in the hBN powder according to the present invention is more than 10.0 μm and 30.0 μm or less, preferably 10.5 μm or more and 30.0 μm or less, more preferably 11.0 μm or more and 28.0 μm or less, still more preferably 12.0 μm or more and 26.0 μm or less, further still more preferably 13.0 μm or more and 24.0 μm or less, further still more preferably 14.0 μm or more and 22.0 μm or less, further still more preferably 15.0 μm or more and 20.0 μm or less, and further still more preferably 16.0 μm or more and 19.5 μm or less from the viewpoint of reducing the contact resistance between primary particles and improving the thermal conductive properties. In the hBN powder comprising large primary particles having an average longer diameter (L) of more than 10.0 μm, the contact resistances between the primary particles and between the primary particle and a resin are reduced and the thermal conductivity can be improved when a composite is formed by the hBN powder and the resin, and the composite is made into a resin composition.

The average thickness (D) of the primary particles in the hBN powder according to the present invention is 1.0 μm or more, preferably 1.2 μm or more, more preferably 1.5 μm or more, still more preferably 2.0 μm or more, further still more preferably 2.5 μm or more, further still more preferably 3.0 μm or more, further still more preferably 3.5 μm or more, and is preferably 5.0 μm or less, more preferably 4.5 μm or less, and still more preferably 4.0 μm or less from the viewpoint in improvements in the thermal conductive properties.

It is to be noted that the average longer particle diameter (L) and average thickness (D) of the primary particles are measured by the method described in Examples.

The aspect ratio [L/D] of the primary particles in the hBN powder according to the present invention is 3.0 or more and 5.0 or less, preferably 3.0 or more and less than 5.0, more preferably 3.4 or more and less than 5.0, still more preferably 3.6 or more and 4.9 or less, further still more preferably 3.8 or more and 4.9 or less, further still more preferably 4.0 or more and 4.8 or less, further still more preferably 4.4 or more and 4.8 or less, and further still more preferably 4.5 or more and 4.8 or less from the viewpoint of suppressing the orientation anisotropy and improving the thermal conductive properties.

It is to be noted that the aspect ratio [L/D] is measured by the method described in Examples.

The content of the primary particles having an individual aspect ratio [l/d] of 3.0 or more and 5.0 or less in the hBN powder according to the present invention is 25% or more, preferably 30% or more, more preferably 40% or more, still more preferably 50% or more, and further still more preferably 60% or more from the viewpoint of improving the filling ability to a resin composition, suppressing the orientation anisotropy, and improving the thermal conductive properties, and is preferably 80% or less, more preferably 70% or less, and still more preferably 65% or less from the viewpoint of production superiority.

It is to be noted that the content is measured by the method described in Examples.

<hBN Powder>

The hBN powder according to the present invention preferably comprises an aggregate of two or more primary particles, and when the hBN powder is put through a sieve having an opening of 106 μm, the hexagonal boron nitride powder passing through the sieve preferably has a 50% volume cumulative particle size $D_{50}(1)$ (hereinafter, also simply referred to as "$D_{50}(1)$") of 25 μm or more and 100 μm or less, and a dispersion liquid obtained by dispersing in water the hBN powder passing through the sieve preferably has a 50% volume cumulative particle size $D_{50}(2)$ (hereinafter, also simply referred to as "$D_{50}(2)$") of 50 μm or less after the dispersion liquid is subjected to an ultrasonic treatment for 3 minutes.

When the $D_{50}(2)$ after the ultrasonic treatment is low, bonding force between primary particles constituting the aggregate is weak, and when the $D_{50}(2)$ after the ultrasonic treatment is high, the bonding force between the primary particles is strong, and therefore the $D_{50}(2)$ after the ultrasonic treatment is an index indicating the bonding force between primary particles constituting the aggregate. Accordingly, by setting the $D_{50}(2)$ after the ultrasonic treatment to 50 μm or less, the primary particles are cracked to allow the aggregate to deform moderately in the process of forming a composite with a resin, and thereby the contact property of the hBN powder in a resin composition is improved to form a thermal conduction path, so that high thermal conductive properties can be exhibited. Moreover, even if the primary particles are cracked in the process of forming a composite with a resin, the hBN powder according to the present invention can suppress the orientation anisotropy in a resin composition or a resin sheet because the hBN powder according to the present invention comprises primary particles having a low aspect ratio. From these viewpoints, the $D_{50}(2)$ after the ultrasonic treatment is preferably 10 μm or more and 50 μm or less, more preferably 12 μm or more and 45 μm or less, still more preferably 14 μm or more and 40 μm or less, further still more preferably 16 μm or more and 35 μm or less, further still more preferably 18 μm or more and 30 μm or less, and further still more preferably 20 μm or more and 25 μm or less.

In addition, the ratio of the $D_{50}$ after the ultrasonic treatment to the $D_{50}$ before the ultrasonic treatment [$D_{50}(2)/D_{50}(1)$] is preferably 0.50 or more and 0.90 or less, more preferably 0.51 or more and 0.85 or less, still more preferably 0.52 or more and 0.80 or less, further still more preferably 0.53 or more and 0.75 or less, further still more preferably 0.55 or more and 0.70 or less, and further still more preferably 0.60 or more and 0.70 or less from the viewpoint of improvements in the thermal conductive properties.

The $D_{50}(2)$ after the ultrasonic treatment is measured in the following manner using a particle size distribution analyzer (manufactured by NIKKISO CO., LTD., model name "Microtrac MT3300EX II") of the laser diffraction scattering method.

Firstly, the hBN powder according to the present invention is classified using a sieve having an opening of 106 μm with a dry type vibrating sieve apparatus (sieving time of 60 minutes) to obtain an hBN powder passing through the sieve, the hBN powder being classified to have a $D_{50}(1)$ ($D_{50}$ before ultrasonic treatment) of 25 μm or more and 100 μm or less (hereinafter, also simply referred to as "classified hBN powder"). Subsequently, a dispersion liquid containing 0.06 g of the resultant classified hBN powder, 50 g of water, and 0.005 g of a dispersant is placed in a 50-ml container and is then subjected to an ultrasonic treatment under conditions of au output of 150 W and an oscillating frequency of 19.5 kHz for 3 minutes, and thereafter the $D_{50}(2)$ after the ultrasonic treatment is measured by a particle size distribution obtained while stirring the dispersion liquid after the ultrasonic treatment using a magnetic stirrer under a condition of a number of revolutions of 400 rpm. In the ultrasonic treatment, an ultrasonic treatment apparatus (manufactured by NIHONSEIKI KAISHA LTD., model name "Ultrasonic Homogenizer US-150V") can be used. In addition, as the dispersant, a commercially available detergent such as, for example, a detergent manufactured by Lion Corporation (trade name "Mama Lemon") can be used.

In addition, the $D_{50}(1)$ before the ultrasonic treatment is measured by the method described in Examples.

It is to be noted that "being classified to have a $D_{50}(1)$ of 25 μm or more and 100 μm or less" in the present invention specifies a condition of a pretreatment of the hBN powder according to the present invention provided for the measurement of the $D_{50}(2)$ after the ultrasonic treatment but does not specify the hBN powder itself according to the present invention.

The BET specific surface area of the hBN powder according to the present invention is preferably less than 5.0 m$^2$/g, more preferably 0.1 m$^2$/g or more and 4.5 m$^2$/g or less, still more preferably 0.2 m$^2$/g or more and 4.0 m$^2$/g or less, further still more preferably 0.3 m$^2$/g or more and 3.5 m$^2$/g or less, further still more preferably 0.3 m$^2$/g or more and 3.0 m$^2$/g or less, further still more preferably 0.4 m$^2$/g or more and 2.5 m$^2$/g or less, further still more preferably 0.5 m$^2$/g or more and 2.0 m$^2$/g or less, further still more preferably 0.5 m$^2$/g or more and 1.5 m$^2$/g or less, further still more preferably 0.5 m$^2$/g or more and 1.0 m$^2$/g or less, and further still more preferably 0.6 m$^2$/g or more and 0.9 m$^2$/g or less from the viewpoint of improvements in the thermal conductive properties. When the BET specific surface area is less than 5.0 m$^2$/g, the specific surface area of the aggregate contained in the hBN powder is also small and the amount of a resin component to be taken in the aggregate in producing a resin composition is small. Therefore, it is considered that the thermal conductive properties are improved because the amount of the resin component existing between the aggregates becomes relatively large to improve the dispersibility of the aggregates to the resin component, so that the hBN powder and the resin component become well blended.

It is to be noted that the BET specific surface area of the hBN powder is measured by the BET one-point method utilizing the fluid process described in Examples.

The purity of the hBN powder according to the present invention, namely the purity of hBN in the hBN powder according to the present invention is preferably 96% by mass or more, more preferably 98% by mass or more, still more preferably 99% by mass or more, further still more preferably 99.5% by mass or more, and further still more preferably 99.8% by mass or more from the viewpoint of improvements in the thermal conductive properties.

It is to be noted that the purity of the hBN powder can be measured by the method described in Examples.

The boron oxide (hereinafter, also simply referred to as "$B_2O_3$") content in the hBN powder according to the present invention is preferably 0.120% by mass or less, more preferably 0.001% by mass or more and 0.110% by mass or less, still more preferably 0.005% by mass or more and 0.100% by mass or less, further still more preferably 0.008% by mass or more and 0.080% by mass or less, and further still more preferably 0.010% by mass or more and 0.070% by mass or less from the viewpoint of improvements in the thermal conductive properties and production superiority.

It is to be noted that the $B_2O_3$ content can be measured by the method described in Examples.

The carbon content in the hBN powder according to the present invention is preferably 0.50% by mass or less, more preferably 0.20% by mass or less, still more preferably 0.10% by mass or less, further still more preferably 0.05% by mass or less, further still more preferably 0.04% by mass or less, further still more preferably 0.03% by mass or less, and further still more preferably 0.02% by mass or less from the viewpoint of improvements in the thermal conductive properties and the electric insulation.

It is to be noted that the carbon content can be measured by the method described in Examples.

[Surface Treatment]

A surface treatment may be performed as necessary on the hBN powder according to the present invention using various coupling agents or the like for the purpose of enhancing the dispersibility in the resin component and improving the processability in producing a resin composition by dispersing the hBN powder according to the present invention in a resin component.

(Coupling Agent)

Examples of the coupling agent include silane-based, titanate-based, and aluminum-based coupling agents, and among these, silane-based coupling agents are preferable in terms of improvements in dispersibility of the hBN powder. As the silane-based coupling agent, aminosilane compounds such as γ-aminopropyltrimethoxysilane, γ-aminopropyltriethoxysilane, γ-(2-aminoethyl)aminopropyltrimethoxysilane, γ-(2-aminoethyl)aminopropyltriethoxysilane, γ-anilinopropyltrimethoxysilane, γ-anilinopropyltriethoxysilane, N-β-(N-vinylbenzylaminoethyl-γ-aminopropyltrimethoxysilane, and N-β-(N-vinylbenzylaminoethyl)-γ-aminopropyltriethoxysilane are particularly preferably used.

[Method for Producing Hexagonal Boron Nitride Powder]

The hBN powder according to the present invention can be obtained by a production method comprising the following steps 1 to 3 using a boron carbide ($B_4C$) powder as a starting material.

Step 1: a step of firing a boron carbide powder at 1600° C. or more and 2200° C. or less under a nitrogen gas atmosphere;

Step 2: a step of heating a fired product obtained in the step 1 at 500° C. or more and less than 1500° C. under an oxygen-containing gas atmosphere, thereby decarbonizing the fired product; and Step 3: a step of firing again a product after decarbonization under a nitrogen gas atmosphere, the product obtained in the step 2, at 1500° C. or more and 2200° C. or less.

(Step 1)

The step 1 is a step of firing a boron carbide powder at 1600° C. or more and 2200° C. or less under a nitrogen gas atmosphere, thereby obtaining a fired product. In the step 1, production of a boron nitride powder is allowed to progress by firing the boron carbide powder under a nitrogen gas atmosphere based on the following formula (1), and to allow the production to progress, sufficient temperature, time, and partial pressure of the nitrogen gas need to be given.

$$(\tfrac{1}{2})B_4C + N_2 \rightarrow 2BN + (\tfrac{1}{2})C \quad (1)$$

The firing temperature in the step 1 is 1600° C. or more and 2200° C. or less. When the firing temperature is 1600° C. or more, the reaction in the formula (1) progresses effectively, and when the firing temperature is 2200° C. or less, the reverse reaction in the formula (1) is suppressed. From these viewpoints, the firing temperature is preferably 1700° C. or more and 2200° C. or less, more preferably 1800° C. or more and 2150° C. or less, and still more preferably 1900° C. or more and 2100° C. or less.

The firing time in the step 1 is preferably 1 hour or more and 20 hours or less, more preferably 2 hours or more and 16 hours or less, still more preferably 3 hours or more and 12 hours or less, and further still more preferably 4 hours or more and 10 hours or less from the viewpoint of production superiority.

Firing is performed under a nitrogen gas atmosphere. The nitrogen gas concentration in the nitrogen gas atmosphere is preferably 60% by volume or more, more preferably 80% by volume or more, still more preferably 90% by volume or more, and further still more preferably 99% by volume or more from the viewpoint of improving reactivity. With respect to an oxygen gas, the less, the better.

The 50% volume cumulative particle size $D_{50}$ of the boron carbide powder to be used is preferably 45 μm or less and 3.0 μm or more. When the $D_{50}$ of the boron carbide powder is 45 μm or less, the reaction in the formula (1) is facilitated, so that the yield of the fired product is improved, and an effective decarbonization in the subsequent decarbonization treatment can be facilitated. In addition, when the 50% volume cumulative particle size $D_{50}$ is 3.0 μm or more, the superiority in productivity is secured, and the size of primary particles of hBN finally obtained can be increased.

From these viewpoints, the 50% volume cumulative particle size $D_{50}$ of the boron carbide powder is more preferably 30 μm or less, still more preferably 25 μm or less, further still more preferably 20 μm or less, further still more preferably 18 μm or less, and further still more preferably 16 μm or less, and is preferably 3.0 μm or more, more preferably 5.0 μm or more, still more preferably 7.0 μm or more, and further still more preferably 10 μm or more.

It is to be noted that the $D_{50}$ of the boron carbide powder can be measured by the method described in Examples.

The purity of the boron carbide powder is preferably 90% by mass or more, more preferably 93% by mass or more, and still more preferably 95% by mass or more from the viewpoint of the superiority in productivity.

In the production method according to the present invention, impurities in the boron carbide powder are removed by high-temperature firing in the step 1 and in the step 3.

(Step 2)

The step 2 is a step of heating the fired product obtained in the step 1 at 500° C. or more and less than 1500° C. under an oxygen-containing gas atmosphere, thereby decarbonizing the fired product to obtain a product. Conventionally, when the fired product is decarbonized, firing has generally been performed adding boron oxide or the like at 1500° C. or more under a non-oxidizing gas atmosphere, but in this case, a fine crystal of boron nitride is newly produced by a reductive nitriding reaction represented by the following formula (2) between a carbon component and boron oxide, so that a uniform grain growth over the whole fired product has been difficult to achieve.

$$B_2O_3 + 3C + N_2 \rightarrow 2BN + 3CO \quad (2)$$

Thus, in the step 2 of the production method according to the present invention, by performing decarbonization through heating at less than 1500° C. under an oxygen-containing gas atmosphere, grain growth during re-firing under a nitrogen gas atmosphere in the step 3 described later can be made uniform. Further, hBN contained in the product is oxidized during the heating and part of the hBN is converted into boron oxide. Thereby, boron oxide which has conventionally been added as a crystal growth assistant at the time of subsequent re-firing in a non-oxidizing gas atmosphere can be made unnecessary or can be greatly reduced.

The heating temperature in the step 2 is 500° C. or more and less than 1500° C. When the heating temperature is 500° C. or more, the decarbonization reaction progresses effectively, and when the heating temperature is less than 1500° C., the reductive nitriding reaction which occurs between the carbon component and boron oxide produced by the oxidation of hexagonal boron nitride and which is represented by the formula (2) can be suppressed to facilitate a uniform grain growth. From these viewpoints, the heating temperature in the step 2 is preferably 600° C. or more and 1300° C. or less, more preferably 700° C. or more and 1100° C. or less, and still more preferably 800° C. or more and 900° C. or less.

The heating time in the step 2 is preferably 1 hour or more and 20 hours or less, more preferably 2 hours or more and 16 hours or less, still more preferably 3 hours or more and 12 hours or less, and further still more preferably 4 hours or more and 10 hours or less from the viewpoint of the superiority in productivity.

Heating is performed under an oxygen-containing gas atmosphere. The partial pressure of the oxygen is not particularly limited, but heating is preferably performed under an atmosphere of an oxygen concentration of preferably 10% by volume or more and 50% by volume or less, more preferably 15% by volume or more and 30% by volume or less. As the oxygen-containing gas, air is preferably used from the viewpoint of production cost.

(Step 3)

The step 3 is a step of firing again a product after decarbonization, the product obtained in the step 2, at 1500° C. or more and 2200° C. or less under a nitrogen gas atmosphere, thereby obtaining the hBN powder according to the present invention. Through the step 3, grain growth of the primary particles in the hBN powder can be achieved.

The firing temperature in the step 3 is 1500° C. or more and 2200° C. or less from the viewpoint of facilitating the grain growth of the hBN primary particles. When the firing temperature is 1500° C. or more, a sufficient grain growth reaction of the hBN primary particles is facilitated, and when the firing temperature is 2200° C. or less, decomposition of hBN is suppressed. From these viewpoints, the firing temperature is preferably 1600° C. or more and 2200° C. or less, more preferably 1700° C. or more and 2200° C. or less.

The firing time in the step 3 is preferably 1 hour or more and 20 hours or less. When the firing time is 1 hour or more, the grain growth reaction of the hBN primary particles progresses sufficiently, and when the firing time is 20 hours or less, firing cost is reduced. From these viewpoints, the firing time is more preferably 1 hour or more and 15 hours or less, still more preferably 3 hours or more and 10 hours or less.

In the production method according to the present invention, a boron compound represented by a composition formula $B_2O_{(3+X)}H_{2x}$ wherein X=0 to 3 is preferably further added from the viewpoint of facilitating the decarbonization and from the viewpoint of facilitating the crystal growth of the hBN primary particles. The addition may be before firing or heating in any of the steps 1 to 3, but from the viewpoint of facilitating the crystal growth of the hBN primary particles, the boron compound is preferably added in the step 3 to the product after decarbonization, which is obtained in the step 2. Thereby, the production of a fine crystal of boron nitride by the reductive nitriding reaction represented by the formula (2) is suppressed, and the decarbonization can be facilitated in the step 2, and the crystal growth of the hBN primary particles can be facilitated sufficiently in the subsequent step 3.

As the boron compound, at least one selected from oxides of boron including: boron oxoacids such as orthoboric acid ($H_3BO_3$), metaboric acid ($HBO_2$) and tetraboric acid ($H_2B_4O_7$); boric anhydride ($B_2O_3$); and the like is preferable, and from the viewpoint of an easy availability and a good miscibility with the product after decarbonization, the boron compound is more preferably boric anhydride ($B_2O_3$).

The purity of the boron compound is preferably 90% by mass or more, more preferably 95% by mass or more, still more preferably 99% by mass or more, and further still more preferably 100% by mass from the viewpoint of the superiority in productivity.

The amount of the boron compound to be added is preferably 10 parts by mass or more and 80 parts by mass or less, more preferably 20 parts by mass or more and 70 parts by mass or less, still more preferably 30 parts by mass or more and 60 parts by mass or less, and further still more preferably 35 parts by mass or more and 55 parts by mass or less based on 100 parts by mass of the product after decarbonization from the viewpoint of facilitating the crystal growth of the hBN primary particles.

In the production method according to the present invention, a calcium compound (hereinafter, also referred to as "Ca compound") is preferably further added in addition to the boron compound from the viewpoint of facilitating the decarbonization and from the viewpoint of facilitating the crystal growth of the hBN primary particles. Examples of the Ca compound include calcium carbonate, calcium oxide, calcium fluoride, and calcium chloride. Among these, calcium carbonate is preferable.

The content of calcium carbonate in the Ca compound is preferably 90% by mass or more, more preferably 95% by mass or more, still more preferably 99% by mass or more, and further still more preferably 100% by mass. The addition may be before firing or heating in any of the steps 1 to 3, but from the viewpoint of facilitating the crystal growth of the hBN primary particles, the Ca compound is preferably added in the step 3 to the product after decarbonization, which is obtained in the step 2.

The amount of the calcium compound to be added is preferably 10 parts by mass or more and 200 parts by mass or less, more preferably 30 parts by mass or more and 160 parts by mass or less, still more preferably 50 parts by mass or more and 140 parts by mass or less, and further still more preferably 70 parts by mass or more and 120 parts by mass or less based on 100 parts by mass of the product after decarbonization from the viewpoint of facilitating the crystal growth of the hBN primary particles.

[Resin Composition]

The resin composition according to the present invention comprises the hexagonal boron nitride powder (hBN powder) and an organic matrix and has a content of the hBN powder of 10% by volume or more and 90% by volume or less based on the total amount of the hBN powder and the organic matrix. The content (% by volume) of the hBN powder in the resin composition according to the present invention is 10% by volume or more and 90% by volume or less, preferably 20% by volume or more and 80% by volume or less, more preferably 25% by volume or more and 75% by volume or less, still more preferably 30% by volume or more and 70% by volume or less, and further still more preferably 35% by volume or more and 65% by volume or less based on the total amount of the hBN powder and the organic matrix from the viewpoint of ease of production in the process of forming a composite with a resin and the thermal conductive properties. In the present invention, the content based on volume (% by volume) of the hBN powder can be determined from the specific gravity of the hBN powder at 25° C. and specific gravities of various resins for use as the organic matrix at 25° C.

By using the hBN powder, the contact resistances between the primary particles and between the primary particle and a resin are reduced when a composite is formed by the hBN powder and the resin, and the composite is made into a resin composition, and as a result, high thermal conductive properties can be exhibited. Further, the hBN powder comprises primary particles having a low aspect ratio, and therefore the orientation anisotropy in a resin composition or a resin sheet can be suppressed.

The content (% by mass) of the hBN powder in the resin composition according to the present invention is preferably 5% by mass or more and 95% by mass or less, more preferably 10% by mass or more and 90% by mass or less, still more preferably 15% by mass or more and 85% by mass or less, further still more preferably 20% by mass or more and 80% by mass or less, and further still more preferably 25% by mass or more and 75% by mass or less based on the total amount of the hBN powder and the organic matrix from the viewpoint of the ease of production in the process of forming a composite with a resin and the thermal conductive properties although the content depends on the type of the organic matrix to be used.

It is to be noted that the content (% by mass) of the hBN powder in the resin composition according to the present invention is measured by a combustion method described in "Testing methods for carbon fiber content and void content of carbon fiber reinforced plastics" (JIS K 7075:1991). In addition, the content (% by volume) of the hBN powder in the resin composition according to the present invention is calculated by dividing the content (% by mass) of the hBN powder obtained by the method by the density of boron nitride.

<Organic Matrix>

The resin composition according to the present invention comprises a resin as an organic matrix.

The resin for use in the present invention preferably comprises at least one resin selected from the group consisting of thermosetting resins, thermoplastic resins, various kinds of rubber, thermoplastic elastomers, oil, and the like.

Examples of the thermosetting resins include epoxy resins, silicone resins, phenol resins, urea resins, unsaturated polyester resins, melamine resins, polyimide resins, polybenzoxazole resins, and urethane resins.

Examples of the thermoplastic resins include: polyolefin resins such as polyethylene, polypropylene, and ethylene-vinyl acetate copolymers; polyester resins such as polyethylene terephthalate, polybutylene terephthalate, and liquid crystal polyesters; and polyvinyl chloride resins, acrylic resins, polyphenylene sulfide resins, polyphenylene ether resins, polyamide resins, polyamideimide resins, and polycarbonate resins.

Examples of the various kinds of rubber include natural rubber, polyisoprene rubber, styrene-butadiene copolymer rubber, polybutadiene rubber, ethylene-propylene copolymers, ethylene-propylene-diene copolymers, butadiene-acrylonitrile copolymers, isobutylene-isoprene copolymers, chloroprene rubber, silicone rubber, fluororubber, chlorosulfonated polyethylenes, and polyurethane rubber. These kinds of rubber are preferably crosslinked and used.

Examples of the thermoplastic elastomers include olefin-based thermoplastic elastomers, styrene-based thermoplastic elastomers, vinyl chloride-based thermoplastic elastomers, urethane-based thermoplastic elastomers, and ester-based thermoplastic elastomers.

Examples of the oil component include grease such as silicone oil.

The organic matrices may be used singly or in a combination or two or more.

The resin for use as the organic matrix can be selected appropriately according to the application of a thermally conductive member obtained using the resin composition according to the present invention and demand characteristics such as the mechanical strength, heat resistance, durability, softness, and flexibility of the thermally conductive member.

Among these, at least one resin selected from the group consisting of various thermosetting resins, thermoplastic resins, rubber, and thermoplastic elastomers, and the like which are used as the organic matrix of the conventional resin sheets, more preferably thermosetting resins, and still more preferably at least one selected from the group consisting of curable epoxy resins and curable silicone resins from the viewpoint of suppressing the orientation anisotropy and improving the thermal conductive properties.

The content (% by volume) of the organic matrix in the resin composition is preferably 10% by volume or more and 90% by volume or less, more preferably 20% by volume or more and 80% by volume or less, still more preferably 25% by volume or more and 75% by volume or less, further still more preferably 30% by volume or more and 70% by volume or less, and further still more preferably 35% by volume or more and 65% by volume or less based on the total amount of the hBN powder and the organic matrix from the viewpoint of the ease of production in the process of forming a composite with a resin and improvements in the thermal conductive properties. In the present invention, the content based on volume (% by volume) of the organic matrix can be determined from the specific gravity of the hBN powder at 25° C. and specific gravities of various resins for use as the organic matrix at 25° C.

The content (% by mass) of the organic matrix in the resin composition according to the present invention is preferably 5% by mass or more and 95% by mass or less, more preferably 10% by mass or more and 90% by mass or less, still more preferably 15% by mass or more and 85% by mass or less, further still more preferably 20% by mass or more and 80% by mass or less, and further still more preferably 25% by mass or more and 75% by mass or less based on the total amount of the hBN powder and the organic matrix from the viewpoint of the ease of production in the process of forming a composite with a resin and the thermal conductive properties although the content depends on the type of the organic matrix to be used.

[Curable Epoxy Resin]

In the resin composition according to the present invention, as the curable epoxy resin for use as the organic matrix, epoxy resins which are in a liquid form at normal temperature and low softening point epoxy resins which are in a solid form at normal temperature are preferable from the viewpoint of dispersibility of the hBN powder to the organic matrix.

The curable epoxy resin is not particularly limited as long as the curable epoxy resin is a compound having two or more epoxy groups in one molecule, and any of the publicly known compounds which have been used conventionally as the epoxy resin can be selected and used appropriately. Examples of such an epoxy resin include bisphenol A type epoxy resins, bisphenol F type epoxy resins, glycidyl ethers of a polycarboxylic acid, and epoxy resins obtained through epoxidation of a cyclohexane derivative. These may be used singly or in a combination of two or more. Among the epoxy resins, bisphenol A type epoxy resins, bisphenol F type epoxy resins, and epoxy resins obtained through epoxidation of a cyclohexane derivative are suitable from the viewpoint of the heat resistance, workability, and the like.

(Curing Agent for Epoxy Resin)

A curing agent for epoxy resins is usually used for curing the curable epoxy resin. The curing agent for epoxy resins is not particularly limited, any of the curing agents which have been used conventionally as the curing agent for epoxy resins can be selected and used appropriately, and examples thereof include amine-based, phenol-based, acid anhydride-based and imidazole-based curing agents. Examples of the amine-based curing agents preferably include dicyandiamide and aromatic diamines such as m-phenylenediamine, 4,4'-diaminodiphenylmethane, 4,4'-diaminodiphenylsulfone, and m-xylylenediamine. Examples of the phenol-based curing agents preferably include phenol novolac resins, cresol novolac resins, bisphenol A type novolac resins, and triazine-modified phenol novolac resins. Examples of the acid anhydride-based curing agents include alicyclic acid anhydrides such as methylhexahydrophthalic anhydride, aromatic acid anhydrides such as phthalic anhydride, aliphatic acid anhydrides such as aliphatic dibasic acid anhydrides, and halogen-based acid anhydrides such as chlorendic anhydride. Examples of the imidazole-based curing agents include 2-methylimidazole, 2-undecylimidazole, 2-heptadecylimidazole, 2-ethyl-4-methylimidazole, 2-phenylimidazole, 2-phenyl-4-methylimidazole, and 1-cyanoethyl-2-ethyl-4-methylimidazole.

These curing agents may be used singly or in a combination of two or more. The amount of the curing agent for epoxy resins to be used is usually selected in a range of an equivalent ratio of about 0.5 to about 1.5, preferably in a range of an equivalent ratio of 0.7 to 1.3 in terms of the equivalent ratio of the curing agent to the curable epoxy resin from the viewpoint of curability, a balance among physical properties of a cured resin, and the like.

(Curing Accelerator for Epoxy Resins)

In the resin composition according to the present invention, a curing accelerator for epoxy resins can be used as necessary together with the curing agent for epoxy resins.

The curing accelerator for epoxy resins is not particularly limited, any of the curing accelerators which have been used conventionally as the curing accelerator for epoxy resins can be selected and used appropriately. Examples include imidazole compounds such as 2-ethyl-4-methylimidazole, 1-benzyl-2-methylimidazole, 2-methylimidazole, 2-ethylimidazole, 2-isopropylimidazole, 2-phenylimidazole, and 2-phenyl-4-methylimidazole, 2,4,6-tris(dimethylaminomethyOphenol, boron trifluoride-amine complexes, and triphenylphosphine. These curing accelerators may be used singly or in a combination of two or more. The amount of the curing accelerator for epoxy resins to be used is usually selected in a range of about 0.1 to about 10 parts by mass, preferably in a range of 0.4 to 5 parts by mass based on 100 parts by mass of the curable epoxy resin from the viewpoint of curing acceleration properties, the balance among physical properties of the cured resin, and the like.

[Curable Silicone Resin]

As the curable silicone resin, a mixture of an addition reaction type silicone resin and a silicone-based crosslinking agent can be used. Examples of the addition reaction type silicone resin include at least one selected from the group consisting of polyorganosiloxanes comprising an alkenyl group as a functional group in the molecule. Preferred examples of the polyorganosiloxanes comprising an alkenyl group as a functional group in the molecule include a polydimethylsiloxane comprising a vinyl group as a functional group, a polydimethylsiloxane comprising a hexenyl group as a functional group, and a mixture thereof.

Examples of the silicone-based crosslinking agent include polyorganosiloxanes comprising at least 2 silicon atom-bonded hydrogen atoms in one molecule, specifically, dimethylsiloxane-methylhydrogensiloxane copolymers end-capped with a dimethylhydrogensiloxy group, dimethylsiloxane-methylhydrogensiloxane copolymers end-capped with a trimethylsiloxy group, poly(methylhydrogensiloxane) end-capped with a trimethylsiloxane group, and poly(hydrogen silsesquioxane).

In addition, as a curing catalyst, a platinum-based compound is usually used. Examples of the platinum-based compound include particulate platinum, particulate platinum adsorbed on a carbon powder carrier, chloroplatinic acid, alcohol-modified chloroplatinic acid, olefin complexes of chloroplatinic acid, palladium, and rhodium catalysts.

The resin composition according to the present invention may further comprise another arbitrary component in a range where the effects of the present invention are obtained. Examples of such an arbitrary component include a particle of a nitride such as aluminum nitride, silicon nitride, and fibrous boron nitride, electrically insulating metal oxides such as alumina, fibrous alumina, zinc oxide, magnesium oxide, beryllium oxide, and titanium oxide, electrically insulating carbon components such as diamond and fullerene, a plasticizing agent, an adhesive, a reinforcing agent, a coloring agent, a heat resistance improver, a viscosity modifier, a dispersion stabilizer, and a solvent.

Moreover, in the resin composition according to the present invention, an inorganic filler such as aluminum hydroxide or magnesium hydroxide, a surface treating agent such as a silane coupling agent which improves the adhesion strength at an interface between the inorganic filler and the resin, a reducing agent, or the like may be added in addition to the materials each listed as an example of the nitride particle and the electrically insulating metal oxide as long as the effects of the present invention are not impaired.

The content of the arbitrary component in the resin composition is preferably 0% by volume or more and 30% by volume or less, more preferably 0% by volume or more and 20% by volume or less, and still more preferably 0.01% by volume or more and 10% by volume or less. In addition, in the case where the resin composition comprises an arbitrary component, the total amount of the hBN powder and the organic matrix in the resin composition is preferably 70% by volume or more and 100% by volume or less, more preferably 80% by volume or more and 100% by volume or less, and still more preferably 90% by volume or more and 99.99% by volume or less.

The resin composition according to the present invention can be produced, for example, in the manner as described below.

The organic matrix is first prepared by mixing the resin, and the curing agent as necessary. In addition, a solvent may further be added as necessary to the organic matrix from the viewpoint of adjusting viscosity in producing the resin sheet described later. Subsequently, the hBN powder is added to the organic matrix so that the hBN powder can be contained in a proportion of 10% by volume or more and 90% by volume or less based on the total amount of the organic matrix and the hBN powder. The weight of the hBN powder at 25° C. and of the resin are each set according to the specific gravity of the hBN powder and the specific gravity of the resin to be used as the organic matrix so that a desired % by volume of the hBN powder and of the resin can be contained, and the hBN powder and the resin are weighed and then mixed to prepare the resin composition.

In the case where the curable epoxy resin is used as a main component of the organic matrix in the resin composition according to the present invention, a mixture of the curable epoxy resin, the curing agent for epoxy resins, and the curing accelerator for epoxy resins which is used as necessary forms the organic matrix. In addition, in the case where the curable silicone resin is used as a main component of the organic matrix, a mixture of the addition reaction type silicone resin, the silicone-based crosslinking agent, and the curing catalyst forms the organic matrix.

Furthermore, in the case where a solvent is added in preparing the organic matrix, components excluding the solvent form the organic matrix.

The resin composition which is obtained in this way can be used for a thermally conductive member such as a thermally conductive sheet, thermally conductive gel, thermally conductive grease, a thermally conductive adhesive, or a phase change sheet. As a result, the heat from a heat generating electronic component such as an MPU, a power transistor, or a transformer can be transferred efficiently to a heat dissipation component such as a heat dissipation fin or a heat dissipation fan.

Among the thermally conductive members, the resin composition is preferably used as a thermally conductive sheet and for a resin sheet. By using the resin composition for a resin sheet, the effects of the resin composition can be particularly exhibited from the viewpoint of suppressing the orientation anisotropy and the viewpoint of improvements in the thermal conductive properties.

[Resin Sheet]

The resin sheet according to the present invention comprises the resin composition or a cured product thereof and is obtained by molding the resin composition into a sheet. In the case where the resin composition is curable, the resin sheet according to the present invention is obtained by molding the resin composition into a sheet and then curing the molded resin composition.

The resin sheet according to the present invention can be produced by applying the resin composition on a release layer of a base material, such as a resin film with a release layer, with a usual coating machine or the like, and, in the case where the resin composition comprises a solvent, then drying the solvent with a far infrared ray radiation heater, or by hot air blowing or the like to form a sheet.

As the release layer, a melamine resin or the like is used. In addition, as the resin film, a polyester resin or the like such as polyethylene terephthalate is used.

In the case where the organic matrix in the resin composition is not a curable organic matrix such as the curable epoxy resin or the curable silicone resin, the resin sheet per se which is formed into a sheet is the resin sheet according to the present invention.

Further, in the case where the organic matrix is a curable matrix, the resin sheet which is obtained above and formed on the base material is pressurized as necessary through the base material from a side of a surface of the base material, the surface not coated with the resin composition, and is then further subjected to a heat treatment to be cured to obtain the resin sheet according to the present invention. The pressurization condition is preferably 15 MPa or more and 20 MPa or less, more preferably 17 MPa or more and 19 MPa or less. In addition, the heat condition is preferably 80° C. or more and 200° C. or less, more preferably 100° C. or more and 150° C. or less. It is to be noted that the base material for the releasable film and the like is usually peeled or removed finally.

The film thickness of the resin sheet according to the present invention which is obtained in this way is preferably 50 µm or more and 10 mm or less, more preferably 50 µm or more and 1.0 mm or less, still more preferably 50 µm or more and 500 µm or less, further still more preferably 60 µm or more and 400 µm or less, and further still more preferably 70 µm or more and 300 µm or less from the viewpoint of moldability. Moreover, the film thickness of the resin sheet according to the present invention is preferably in a range of 50 µm or more and 150 µm or less, more preferably 60 µm or more and 130 µm or less, and still more preferably 70 µm or more and 110 µm or less from the viewpoint of reducing the weight and thickness of electronic components and the like for which the resin sheet is used.

The resin sheet according to the present invention has a thermal conductivity in the thickness direction of preferably 20 W/m·K or more and further still more preferably 21 W/m·K or more from the viewpoint of heat dissipation properties of the thermally conductive members.

As for the thermal conductivity, the thermal diffusivity is measured with a model name "LFA447 NanoFlash" manufactured by Erich NETZSC GmbH & Co. Holding KG, and a value calculated by multiplying the thermal diffusivity value by the theoretical values of the specific heat and the density of each resin sheet can be determined as the thermal conductivity in the thickness direction of the resin sheet.

It is to be noted that in the case where, for example, a curable liquid epoxy resin is used as the organic matrix, the theoretical value of the specific heat of the resin sheet can be calculated by the following expression wherein the theoretical density of boron nitride is assumed to be 2.27 g/cm$^3$; the theoretical density of the resin component is assumed to be 1.17 g/cm$^3$; the theoretical specific heat of boron nitride is assumed to be 0.80 J/(g·k); the theoretical specific heat of the resin component is assumed to be 1.80 J/(g·k); a value obtained by multiplying the theoretical specific heat of boron nitride by the theoretical density of boron nitride and the content (% by volume) of boron nitride in the resin sheet and a value obtained by multiplying the theoretical specific heat of the resin component by the theoretical density of the resin component and the content (% by volume) of the resin component in the resin sheet are summed up; and the result is divided by a value obtained by summing up a value obtained by multiplying the theoretical density of boron nitride by the content (% by volume) of boron nitride in the resin sheet and a value obtained by multiplying the theoretical density of the resin component by the content (% by volume) of the resin component in the resin sheet.

Theoretical value of specific heat of resin sheet=
[(0.80×2.27×content (% by volume) of boron nitride+1.80×1.17×content (% by volume) of resin component)/(2.27×content (% by volume) of boron nitride+1.17×content (% by volume) of resin component)]

In addition, it is to be noted that in the case where, for example, a curable liquid epoxy resin is used as the organic matrix, the theoretical value of the density of the resin sheet can be calculated by the following expression wherein the theoretical density of boron nitride is assumed to be 2.27 g/cm$^3$; the theoretical density of the resin component is assumed to be 1.17 g/cm$^3$; a value obtained by multiplying the theoretical density of boron nitride by the content (% by volume) of boron nitride in the resin sheet and a value obtained by multiplying the theoretical density of the resin component by the content (% by volume) of the resin component in the resin sheet are summed up; and the result is multiplied by $\frac{1}{100}$.

Theoretical value of density of resin sheet=[(2.27×content (% by volume) of boron nitride+1.17×content (% by volume) of resin component)×($\frac{1}{100}$)]

The resin sheet according to the present invention has a specific gravity rate of preferably 90% or more and 100% or less, more preferably 95% or more and 100% or less, and still more preferably 98% or more and 100% or less, and further still more preferably 100% from the viewpoint of the electric insulation.

The specific gravity rate can be calculated by the following expression wherein the specific gravity of the resin sheet, which is obtained by an Archimedes method through measurement using an electronic balance (model name "CP224S") and specific gravity/density determination kit (model name "YDK01/YDK01-OD/YDK01LP") each manufactured by Sartorius Mechatronics Japan K.K., is divided by the theoretical specific gravity of the resin sheet, and the result is multiplied by 100.

Specific gravity rate=[(specific gravity of resin sheet obtained through measurement/theoretical specific gravity of resin sheet)×100]

It is to be noted that in the case where, for example, a curable liquid epoxy resin is used as the organic matrix, the theoretical specific gravity of the resin sheet can be calculated by the following expression wherein the theoretical density of boron nitride is assumed to be 2.27 g/cm$^3$; the theoretical density of the resin component is assumed to be 1.17 g/cm$^3$; a value obtained by multiplying the theoretical density of boron nitride by the content (% by volume) of boron nitride in the resin sheet and a value obtained by multiplying the theoretical density of the resin component by the content (% by volume) of the resin component in the resin sheet are summed up; and the result is multiplied by $\frac{1}{100}$.

Theoretical specific gravity of resin sheet=[(2.27×content (% by volume) of boron nitride+1.17×content (% by volume) of resin component)×($\frac{1}{100}$)]

The resin sheet thus obtained can be made to be a product form for use as a resin sheet in a state where the obtained resin sheet is peeled from the releasable film or in a state where the releasable film is used as a protective film.

Moreover, the resin sheet according to the present invention may have a configuration in which an adhesive layer is further provided on the upper surface or the lower surface of the resin sheet, thereby enhancing convenience during the use of a product.

Furthermore, the resin sheet according to the present invention may be used by laminating or embedding a member in a sheet form, a fiber form, or a net-like appearance on one surface or both surfaces thereof, or in the sheet, for improving workability or reinforcement.

The resin sheet according to the present invention is used, for example, as a thermally conductive sheet with which the heat from a heat generating electronic component such as an MPU, a power transistor, or a transformer is transferred to a heat dissipation component such as a heat dissipation fin or a heat dissipation fan, and is used by being interposed between the heat generating electronic component and the heat dissipation component. Thereby, the heat transfer between the heat generating electronic component and the heat dissipation component becomes good and malfunction of the heat generating electronic component can be reduced remarkably.

EXAMPLES

Hereinafter, the present invention will be described further specifically giving Examples and Comparative Examples, but the present invention is not limited by these examples.

<Production of hBN Powder>

Example 1

(Step 1)

In a graphite crucible, 100 g of a commercially available boron carbide powder (50% volume cumulative particle size $D_{50}$: 13 μm, purity: 95% by mass) was placed, and fired at 2000° C. under a nitrogen gas atmosphere for 10 hours using a high-frequency furnace. The resultant fired product contained carbon as an impurity and therefore exhibited a black color.

(Step 2)

The fired product was placed in an alumina crucible and heated at 900° C. under an air atmosphere for 10 hours using an electric furnace. The obtained product exhibited a gray color because decarbonization had progressed in the obtained product.

(Step 3)

A mixture was obtained by adding 25 parts by mass of boron oxide ($B_2O_3$, boric anhydride) manufactured by KANTO CHEMICALS CO., INC. as the boron compound and 100 parts by mass of calcium carbonate ($CaCO_3$) to 100 parts by mass of the product after decarbonization and mixing a resultant mixture, and the mixture was then placed in a graphite crucible and fired again at 1600° C. to 2200° C. under a nitrogen gas atmosphere for 10 hours in total using a high-frequency furnace to obtain a product containing a white, highly crystallized hBN powder.

It is to be noted that the crystal structure of hBN was checked by analysis with an X-ray diffraction apparatus (manufactured by PANalytical, model name "X'Pert PRO"). The crystal structure of hBN in the following Examples and Comparative Examples was checked in the same manner.

Evaluation was conducted by the method described later for the hBN powder obtained by washing the product with hydrochloric acid.

Further, a resin sheet was prepared using the hBN powder by the method of preparing a resin composition and the method of preparing a resin sheet, the methods described later.

The thermal conductivity was measured for the resin sheet by the method described later.

Example 2

(Step 1)

In a graphite crucible, 100 g of the same boron carbide powder as the one in Example 1 was placed, and then fired at 2000° C. under a nitrogen gas atmosphere for 8 hours using a high-frequency furnace. The resultant fired product contained carbon as an impurity and therefore exhibited a black color.

(Step 2)

The fired product was placed in an alumina crucible and heated at 700° C. under an air atmosphere for 15 hours using an electric furnace. The obtained product exhibited a gray color because decarbonization had progressed in the obtained product.

(Step 3)

A mixture obtained by adding 50 parts by mass of boron oxide ($B_2O_3$, boric anhydride) manufactured by KANTO CHEMICAL CO., INC. as the boron compound and 80 parts by mass of calcium carbonate ($CaCO_3$) to 100 parts by mass of the product after decarbonization and mixing a resultant mixture, and the mixture was then placed in a graphite crucible, and fired again at 1600 to 2200° C. under a nitrogen gas atmosphere for 10 hours in total using a high-frequency furnace to obtain a product containing a white, highly crystallized hBN powder.

Evaluation was conducted by the method described later for the hBN powder obtained by washing the product with hydrochloric acid.

Further, a resin sheet was prepared using the hBN powder by the method of preparing a resin composition and the method of preparing a resin sheet, the methods described later.

The thermal conductivity was measured for the resin sheet by the method described later.

Comparative Example 1

(Step 1)

In a graphite crucible, 100 g of the same boron carbide powder as the one in Example 1 was placed, and then fired at 2000° C. under a nitrogen gas atmosphere for 10 hours using a high-frequency furnace. The resultant fired product contained carbon as an impurity and therefore exhibited a black color.

(Step 3')

A mixture obtained by adding 120 parts by mass of boron oxide ($B_2O_3$, boric anhydride) manufactured by KANTO CHEMICAL CO., INC. as the boron compound and 80 parts by mass of calcium carbonate ($CaCO_3$) to 100 parts by mass of the fired product was mixed, then placed in a graphite crucible, and fired again at 1600 to 2200° C. under a nitrogen gas atmosphere for 10 hours in total using a high-frequency furnace to obtain a product containing a highly crystallized hBN powder.

Evaluation was conducted by the method described later for the hBN obtained by washing the product with hydrochloric acid.

Further, a resin sheet was prepared using the hBN powder by the method of preparing a resin composition and the method of preparing a resin sheet, the methods described later.

The thermal conductivity was measured for the resin sheet by the method described later.

Comparative Example 2

A mixture obtained by adding 4 g of boric acid, 2 g of melamine, and 1 g of water was stirred and mixed, and the resultant mixture was put into a metal mold and then pressurized to obtain a molded body having a density of 0.7 g/cm³. A dried product obtained by drying the molded body in a dryer at 300° C. for 100 minutes was calcined at 1100°

C. under an NH$_3$ gas atmosphere for 120 minutes. The calcined product thus obtained (crude hBN) was pulverized to obtain a crude hBN powder (content of boron oxide: 35% by mass).

As the carbon source (C), 10 parts by mass of the artificial graphite fine powder "UF-G30" manufactured by Showa Denko K.K., 0.4 parts by mass of calcium carbonate as the Ca compound, and 10 parts by mass of an aqueous PVA solution (concentration of 2.5% by mass) were added based on 100 parts by mass of the crude hBN powder to obtain a mixture having a content of the carbon source in terms of carbon of 10 parts by mass based on 100 parts by mass of the crude hBN powder.

The mixture was stirred and mixed with a mixer, thereafter put into a metal mold, and then pressurized to obtain a molded body having a density of 1.2 g/cm$^3$. The molded body was dried in a dryer at 300° C. for 6 hours to obtain a dried product. The dried product was fired using a high-frequency furnace at 1750° C. to 2200° C. under a nitrogen gas atmosphere for 6 hours in total to obtain an hBN fired product. Evaluation was conducted by the method described later for the hBN powder obtained by cracking the hBN fired product.

Further, a resin sheet was prepared using the hBN powder by the method of preparing a resin composition and the method of preparing a resin sheet, the methods described later.

The thermal conductivity was measured for the resin sheet by the method described later.

Comparative Example 3

Evaluation was conducted by the method described later using an hBN powder "UHP-EX" manufactured by Showa Denko K.K.

Further, a resin sheet was prepared using the hBN powder by the method of preparing a resin composition and the method of preparing a resin sheet, the methods described later.

The thermal conductivity was measured for the resin sheet by the method described later.

<Preparation of Resin Composition>

A resin composition was prepared using each of the hBN powders obtained in Examples and Comparative Examples.

Firstly, 100 parts by mass of a curable liquid epoxy resin (manufactured by Japan Epoxy Resin, trade name "jER 828", bisphenol A type, epoxy equivalence of 184 to 194 g/eq) and 5 parts by mass of imidazole (manufactured by SHIKOKU CHEMICALS CORPORATION, trade name "2E4MZ-CN") as a curing agent were mixed to prepare an organic matrix.

Subsequently, each of the hBN powders obtained in Examples and Comparative Examples was added thereto so that the content of the hBN powder was 60% by volume based on the total amount of the hBN powder and the organic matrix, and the resultant mixture was stirred and mixed using MAZERUSTAR® manufactured by KURABO INDUSTRIES LTD. to prepare a resin composition.

It is to be noted that the content based on volume (% by volume) of the hBN powder was determined from the specific gravity of the hBN powder (2.27) at 25° C. and the specific gravity of the curable liquid epoxy resin (1.17) for use as the organic matrix at 25° C.

<Preparation of Resin Sheet>

Molding was performed using the resin composition and a metallic mold on a releasable film cut to 10.5 cm wide and 13 cm length so that the cured film thickness was 500 μm or less. Thereafter, the molded resin composition was interposed between releasable films, and then crimping was performed on the molded resin composition through the releasable films with a metallic mold under conditions of 120° C. and 18 MPa for 10 minutes to cure the resin composition, thereby preparing a resin sheet.

[Evaluation]

The following evaluations were conducted for the boron carbide powder used in Examples and Comparative Examples, each of the hBN powders obtained in Examples and Comparative Examples, and each of the resin sheets obtained in Examples and Comparative Examples. The evaluation results are shown in Table 1.

($D_{50}$ of Boron Carbide Powder)

A dispersion liquid containing 0.1 g of the boron carbide powder used in Examples and Comparative Examples, 50 g of water, and, as a dispersant, 0.005 g of a commercially available detergent (trade name "Mama Lemon", manufactured by Lion Corporation) was prepared. Subsequently, the 50% volume cumulative particle size $D_{50}$ of the boron carbide powder was measured by a particle size distribution obtained using a particle size distribution analyzer (manufactured by NIKKISO CO., LTD., model name "Microtrac MT3300EX II") while stirring the dispersion liquid using a magnetic stirrer under a condition of a number of revolutions of 400 rpm.

(Average Longer Diameter (L), Average Thickness (D), and Aspect Ratio [L/D] of Primary Particles in hBN Powder)

An SEM image was taken using a scanning electron microscope for each of the hBN powders obtained in Examples and Comparative Examples, and 100 hBN primary particles the longer diameter and the thickness of which are measurable were arbitrarily extracted from the obtained SEM image to measure the lengths of the longer diameters and the thicknesses. The number average value of the longer diameters was determined as the average longer diameter (L), and the number average value of the thicknesses was determined as the average thickness (D) to calculate the aspect ratio [L/D].

(Content of Primary Particles Having Aspect Ratio of 3.0 or More and 5.0 or Less)

An SEM image was taken using a scanning electron microscope for each of the hBN powders obtained in Examples and Comparative Examples, and 100 hBN primary particles the longer diameter and the thickness of which are measurable were arbitrarily extracted from the obtained SEM image, and the proportion of the number of primary particles having an aspect ratio [l/d] of 3.0 or more and 5.0 or less was calculated as the content (%).

($D_{50}(1)$ Before Ultrasonic Treatment of Classified hBN Powder and $D_{50}(2)$ after Ultrasonic Treatment of Classified hBN Powder)

The hBN powder obtained in each of Examples and Comparative Examples was classified using a sieve having an opening of 106 μm with a dry type vibrating sieve apparatus (manufactured by KOEISANGYO Co., Ltd., trade name "SATO'S SYSTEM VIBRO SEPARATOR") setting the sieving time to 60 minutes to obtain a classified hBN powder passing through the sieve, and then a dispersion liquid containing 0.06 g of the classified hBN powder, 50 g of water, and, as a dispersant, 0.005 g of a commercially available detergent (trade name "Mama Lemon", manufactured by Lion Corporation) was prepared. The $D_{50}(1)$ before the ultrasonic treatment was measured by a particle size distribution obtained using a particle size distribution analyzer (manufactured by NIKKISO CO., LTD., model name "Microtrac MT3300EX II") while stirring the dispersion liquid using a magnetic stirrer under a condition of a number of revolutions of 400 rpm.

Subsequently, a dispersion liquid containing 0.06 g of the classified hBN powder, 50 g of water, and, as a dispersant, 0.005 g of a commercially available detergent (trade name "Mama Lemon", manufactured by Lion Corporation) was placed in a 50-ml container and was then subjected to an ultrasonic treatment using an ultrasonic treatment apparatus (manufactured by NIHONSEIKI KAISHA LTD., model name "Ultrasonic Homogenizer US-150V") under conditions of au output of 150 W and an oscillating frequency of 19.5 kHz for 3 minutes. Thereafter, the $D_{50}(2)$ after the ultrasonic treatment was measured by a particle size distribution obtained using the particle size analyzer while stirring the dispersion liquid after the ultrasonic treatment using a magnetic stirrer under a condition of a number of revolutions of 400 rpm.

Further, the $D_{50}(1)$ before the ultrasonic treatment and the $D_{50}(2)$ after the ultrasonic treatment obtained by the above measurement were used to calculate the ratio $[D_{50}(2)/D_{50}(1)]$ rounded off to two decimal places.

(BET Specific Surface Area of hBN Powder)

The BET specific surface area was measured for each of the hBN powders obtained in Examples and Comparative Examples by the BET one-point method utilizing the fluid process using a full-automatic BET specific surface area measuring apparatus (manufactured by Yuasa Ionics Inc., model name "Multisorb 16").

(Boron Oxide ($B_2O_3$) Content in hBN Powder)

Each of the hBN powders obtained in Examples and Comparative Examples was subjected to an acid treatment with 0.1 N a diluted sulfuric acid solution (hereinafter, also referred to as "acid solution"). Through this acid treatment, boron oxide ($B_2O_3$) in the hBN powder dissolves in the acid solution. Subsequently, the amount of an B element existing in the acid solution after the acid treatment was measured with an apparatus for ICP analysis (manufactured by SII Nano Technology Inc., model name "SPS 3500"). The amount of $B_2O_3$ which had dissolved through the acid treatment was calculated as the content of $B_2O_3$ from the amount of the B element existing in the acid solution after the acid treatment.

(Carbon Content in hBN Powder)

The carbon content in each of the hBN powder obtained in each of Examples and Comparative Examples was measured using a carbon analyzer (manufactured by LECO Japan Corporation, model name "CS230").

(Purity of hBN Powder)

The total amount of the $B_2O_3$ content and the carbon content in the hBN powder measured as described above were regarded as the amount of impurities to determine the purity of the hBN powder.

(Thermal Conductivity of Resin Sheet)

The thermal diffusivity of each of the resin sheets obtained in Examples and Comparative Examples was measured with a model name "LFA447 NanoFlash" manufactured by Erich NETZSC GmbH & Co. Holding KG, and the thermal conductivity in the thickness direction of a resin sheet was calculated by multiplying the thermal diffusivity by the theoretical values of the specific heat and density of each resin sheet.

It is to be noted that the theoretical value of the specific heat of the resin sheet was calculated by the following expression wherein the theoretical density of boron nitride is assumed to be 2.27 $g/cm^3$; the theoretical density of the resin component is assumed to be 1.17 $g/cm^3$; the theoretical specific heat of boron nitride is assumed to be 0.80 J/(g·k); the theoretical specific heat of the resin component is assumed to be 1.80 J/(g·k); a value obtained by multiplying the theoretical specific heat of boron nitride by the theoretical density of boron nitride and the content (% by volume) of boron nitride in the resin sheet and a value obtained by multiplying the theoretical specific heat of the resin component by the theoretical density of the resin component and the content (% by volume) of the resin component in the resin sheet are summed up; and the result is divided by a value obtained by summing up a value obtained by multiplying the theoretical density of boron nitride by the content (% by volume) of boron nitride in the resin sheet and a value obtained by multiplying the theoretical density of the resin component by the content (% by volume) of the resin component in the resin sheet.

Theoretical value of specific heat of resin sheet=
[(0.80×2.27×content (% by volume) of boron nitride+1.80×1.17×content (% by volume) of resin component)/(2.27×content (% by volume) of boron nitride+1.17×content (% by volume) of resin component)]

The theoretical value of the specific heat of the resin sheets was calculated by the above expression and was found to be 1.06 J/(g·k).

In addition, the theoretical value of the density of a resin sheet was calculated by the following expression wherein the theoretical density of boron nitride is assumed to be 2.27 $g/cm^3$; the theoretical density of the curable liquid epoxy resin component is assumed to be 1.17 $g/cm^3$; a value obtained by multiplying the theoretical density of boron nitride by the content (% by volume) of boron nitride in the resin sheet and a value obtained by multiplying the theoretical density of the curable liquid epoxy resin component by the content (% by volume) of the curable liquid epoxy resin component in the resin sheet are summed up; and the result is multiplied by 1/100.

Theoretical value of density of resin sheet=[(2.27× content (% by volume) of boron nitride+1.17× content (% by volume) of resin component)× (1/100)]

The theoretical value of the density of the resin sheets was calculated by the above expression and was found to be 1.83 $g/cm^3$.

TABLE 1

| | | Average longer diameter (L) μm | Average thickness (D) μm | Aspect ratio [L/D] — | Content *1 % | $D_{50}(1)$ before ultrasonic treatment μm | $D_{50}(2)$ after ultrasonic treatment μm | Ratio of $D_{50}(2)$ after ultrasonic treatment to $D_{50}(1)$ before ultrasonic treatment $[D_{50}(2)/D_{50}(1)]$ — | BET specific surface area $m^2/g$ | $B_2O_3$ content % by mass | Carbon content % by mass | Purity % by mass | Thermal conductivity *2 |
|---|---|---|---|---|---|---|---|---|---|---|---|---|---|
| Example | 1 | 16.8 | 3.5 | 4.8 | 63 | 35.6 | 23.8 | 0.67 | 0.9 | 0.01 | 0.01 | 99.98 | 23.1 |
| | 2 | 19.1 | 3.9 | 4.9 | 61 | 38.4 | 24.2 | 0.63 | 0.7 | 0.01 | 0.01 | 99.98 | 21.8 |

TABLE 1-continued

| | | Average longer diameter (L) μm | Average thickness (D) μm | Aspect ratio [L/D] — | Content *1 % | $D_{50}(1)$ before ultrasonic treatment μm | $D_{50}(2)$ after ultrasonic treatment μm | Ratio of $D_{50}(2)$ after ultrasonic treatment to $D_{50}(1)$ before ultrasonic treatment $[D_{50}(2)/D_{50}(1)]$ — | BET specific surface area m²/g | $B_2O_3$ content % by mass | Carbon content % by mass | Purity % by mass | Thermal conductivity *2 |
|---|---|---|---|---|---|---|---|---|---|---|---|---|---|
| Comparative | 1 | 18.8 | 2.4 | 7.8 | 21 | 57.2 | 25.5 | 0.45 | 1.6 | 0.01 | 0.01 | 99.92 | 19.8 |
| Example | 2 | 9.6 | 0.6 | 16.0 | 1 | 24.7 | 12.4 | 0.50 | 3.5 | 0.05 | 0.01 | 99.94 | 19.6 |
| | 3 | 10.5 | 0.8 | 13.1 | 2 | 35.3 | 18.1 | 0.51 | 3.1 | 0.3 | 0.02 | 99.68 | 12.4 |

*1: Content (% by number) of primary particles having aspect ratio [l/d] of 3.0 or more and 5.0 or less
*2: Thermal conductivity in thickness direction of resin sheet It is understood from Table 1 that the hBN powders of Examples 1 and 2 have a larger average longer diameter (L), as large as more than 10 μms, have a lower aspect ratio [L/D], as low as 3.0 or more and 5.0 or less, and have a higher purity than the hBN powders of Comparative Examples 1 to 3.

In addition, the content of the primary particles having an aspect ratio [l/d] of 3.0 or more and 5.0 or less is 25% or more in Examples 1 and 2, and therefore it is considered that the primary particles of hBN maintain random orientation in the process of forming a composite with a resin in molding the resin composition comprising the hBN powder into a resin sheet, and, further, in the obtained resin sheets, so that the orientation anisotropy can be suppressed and a high thermal conductivity can be exhibited.

The invention claimed is:

1. A hexagonal boron nitride powder having: an average longer diameter (L) of primary particles in the hexagonal boron nitride powder of more than 10.0 μm and 30.0 μm or less; an average thickness (D) of the primary particles in the hexagonal boron nitride powder of 1.0 μm or more; a ratio of the average longer diameter (L) to the average thickness (D), [L/D], of 3.0 or more and 5.0 or less; and a content of primary particles having an individual aspect ratio of a longer diameter (l) to a thickness (d), [l/d], of 3.0 or more and 5.0 or less of 60% or more.

2. The hexagonal boron nitride powder according to claim 1, wherein the hexagonal boron nitride powder comprises an aggregate of two or more primary particles, and when the hexagonal boron nitride powder is put through a sieve having an opening of 106 μm, the hexagonal boron nitride powder passing through the sieve has a 50% volume cumulative particle size $D_{50}(1)$ of 25 μm or more and 100 μm or less, and a dispersion liquid obtained by dispersing in water the hexagonal boron nitride powder passing through the sieve has a 50% volume cumulative particle size $D_{50}(2)$ of 50 μm or less after the dispersion liquid is subjected to an ultrasonic treatment for 3 minutes.

3. The hexagonal boron nitride powder according to claim 1, having a BET specific surface area of 2.0 m²/g or less.

4. A resin composition comprising:
the hexagonal boron nitride powder according to claim 1; and
an organic matrix, wherein
the composition has a content of the hexagonal boron nitride powder of 10% by volume or more and 90% by volume or less based on a total amount of the hexagonal boron nitride powder and the organic matrix.

5. A resin sheet comprising the resin composition according to claim 4 or a cured product thereof.

6. A method for producing the hexagonal boron nitride powder according to claim 1, the method comprising the following steps 1 to 3:
Step 1: a step of firing a boron carbide powder at 1600° C. or more and 2200° C. or less under a nitrogen gas atmosphere;
Step 2: a step of heating a fired product obtained in the step 1 at 500° C. or more and less than 1500° C. under an oxygen-containing gas atmosphere, thereby decarbonizing the fired product; and
Step 3: a step of firing again a product after decarbonization, the product obtained in the step 2, at 1500° C. or more and 2200° C. or less under a nitrogen gas atmosphere.

7. The method for producing the hexagonal boron nitride powder according to claim 6, wherein 10 parts by mass or more and 80 parts by mass or less of a boron compound represented by a composition formula $B_2O_{(3+X)}H_{2X}$ wherein X=0 to 3 based on 100 parts by mass of the product after decarbonization is added in the step 3.

8. The method for producing the hexagonal boron nitride powder according to claim 6, wherein 10 parts by mass or more and 200 parts by mass or less of a calcium compound based on 100 parts by mass of the product after decarbonization is added in the step 3.

* * * * *